United States Patent
Sharma

(10) Patent No.: US 10,869,346 B2
(45) Date of Patent: Dec. 15, 2020

(54) COMMUNICATIONS SYSTEM

(71) Applicant: NEC Corporation, Tokyo (JP)

(72) Inventor: Vivek Sharma, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 16/041,546

(22) Filed: Jul. 20, 2018

(65) Prior Publication Data

US 2018/0332646 A1 Nov. 15, 2018

Related U.S. Application Data

(63) Continuation of application No. 15/698,300, filed on Sep. 7, 2017, now abandoned, which is a continuation
(Continued)

(30) Foreign Application Priority Data

Sep. 24, 2012 (GB) .................................. 1217019.7

(51) Int. Cl.
*H04W 4/00* (2018.01)
*H04W 76/14* (2018.01)
(Continued)

(52) U.S. Cl.
CPC ........... *H04W 76/14* (2018.02); *H04W 36/03* (2018.08); *H04W 48/16* (2013.01); *H04W 76/23* (2018.02); *H04W 84/08* (2013.01)

(58) Field of Classification Search
CPC ..... H04W 76/14; H04W 36/03; H04W 76/23; H04W 48/16; H04W 84/08
(Continued)

(56) References Cited

U.S. PATENT DOCUMENTS

2008/0318612 A1 12/2008 Axnas et al.
2011/0188485 A1 8/2011 Fodor et al.
(Continued)

FOREIGN PATENT DOCUMENTS

CN 101371506 A 2/2009
CN 102461297 A 5/2012
(Continued)

OTHER PUBLICATIONS

3GPP TS 23.401 v11.2.0, "3rd Generation Partnerhsip Project; Technical Specification Group Services and System Aspects; General Packet Radio Service (GPRS) enhancements for Evolved Universal Terrestrial Radio Access Network (E-UTRAN) Access (Release 11)", Technical Specification, Jun. 2012, 285 pages.
(Continued)

*Primary Examiner* — Tanmay K Shah
(74) *Attorney, Agent, or Firm* — Wilmer Cutler Pickering Hale and Dorr LLP

(57) ABSTRACT

A system is disclosed in which a mobile communication device establishes device-to-device (D2D) communication with another mobile communication device, and searches for a communication network whilst engaged in the D2D communication. When it finds a communication network, the mobile communication device indicates that it is engaged in the D2D communication. The mobile communication device continues, or does not continue, the D2D communication based on an authorisation by the communication network.

10 Claims, 6 Drawing Sheets

Related U.S. Application Data of application No. 14/430,032, filed as application No. PCT/JP2013/073235 on Aug. 23, 2013, now Pat. No. 9,788,355.

(51) Int. Cl.
*H04W 48/16* (2009.01)
*H04W 76/23* (2018.01)
*H04W 36/00* (2009.01)
*H04W 84/08* (2009.01)

(58) Field of Classification Search
USPC .......................................................... 455/434
See application file for complete search history.

(56) References Cited

U.S. PATENT DOCUMENTS

| | | | |
|---|---|---|---|
| 2011/0228666 | A1 | 9/2011 | Barbieri et al. |
| 2011/0268004 | A1 | 11/2011 | Doppler et al. |
| 2015/0296443 | A1 | 10/2015 | Lim et al. |
| 2017/0280344 | A1* | 9/2017 | Siomina ............... H04W 24/10 |

FOREIGN PATENT DOCUMENTS

| | | |
|---|---|---|
| CN | 102893657 A | 1/2013 |
| JP | 2008-510344 A | 4/2008 |
| JP | 2012-143002 A | 7/2012 |
| KR | 2010-0039882 A | 4/2010 |
| KR | 2011-0089311 A | 8/2011 |
| KR | 2012-0037963 A | 4/2012 |
| WO | WO-01/22755 A1 | 3/2001 |
| WO | WO-2004/103008 A1 | 11/2004 |
| WO | WO-2005/053343 A1 | 6/2005 |
| WO | WO-2006/016331 A1 | 2/2006 |
| WO | WO-2011/011637 A2 | 1/2011 |
| WO | WO-2011/096855 A1 | 8/2011 |
| WO | WO-2011/116017 A1 | 9/2011 |
| WO | WO-2012/015698 A8 | 2/2012 |

OTHER PUBLICATIONS

3GPP TS 36.300 v11.2.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 11)", Technical Specification; Jun. 2012, 201 pages.

3GPP TS 36.331 v11.0.0, "3rd Generation Partnership Project; Technical Specification Group Radio Access Network; Evolved Universal Terrestrial Radio Access (E-UTRA); Radio Resource Control (RRC); Protocol Specification (Release 11)", Technical Specification, Jun. 2012, 302 pages.

3GPP TS 36.331 v11.2.0, "3rd Generation Partnership Project; Technical Specification Group Radio Access Network; Evolved Universal Terrestrial Radio Access (E-UTRA); Radio Resource Control (RRC); Protocol Specification (Release 11)", Technical Specification, Dec. 2012, 340 pages.

European Communication Pursuant to Article 94(3) EPC issued in corresponding European Patent Application No. 13760122.5, dated Oct. 19, 2016, 8 pages.

International Search Report, Corresponding to PCT/JP2013/073235, dated Feb. 21, 2014, 2 pages.

Japanes Office Action issued by the Japan Patent Office for Application No. 2015-514681 dated May 25, 2016 (10 pages).

Japanese Decision to Grant a Patent issued in Japanese Patent Application No. 2015-514681, dated Jan. 5, 2017, 6 pages.

Korean Office Action issued by the Korean Intellectual Property Office for Application No. 2015-7007367 dated Mar. 11, 2016 (20 pages).

Japanese Fourth Office Action issued in Japanese Patent Application No. 201380049784.0, dated May 27, 2020, 13 pages.

Chinese Fourth Office Action issued in Chinese Patent Application No. 201380049784.0, dated May 27, 2020, 13 pages.

\* cited by examiner

COMMUNICATIONS SYSTEM

CROSS-REFERENCE TO RELATED APPLICATIONS

This application is a continuation of U.S. patent application Ser. No. 15/698,300 entitled "Communications System", filed on Sep. 7, 2017, which is a continuation of U.S. patent application Ser. No. 14/430,032 entitled "Communications System", filed on Mar. 20, 2015, which is a national stage application of International Application No. PCT/JP2013/073235 entitled "Reducing Interference Resulting From Device-To-Device Communication", filed on Aug. 23, 2013, which claims the benefit of priority from United Kingdom Patent Application No. 1217019.7, filed on Sep. 24, 2012, the disclosures of which are incorporated herein in their entirety by reference thereto.

TECHNICAL FIELD

The present invention relates to a communications system and to parts and methods thereof. The invention has particular but not exclusive relevance to wireless communications systems and devices thereof operating according to the 3GPP standards or equivalents or derivatives thereof.

BACKGROUND ART

Wireless communications systems enable users of User Equipment (UE) to communicate with other such users via one of a number of base stations and a core network. Typically, the UEs are mobile terminals, such as cellular telephones and the like. In an active or connected state a UE is registered with the network and has a Radio Resource Control (RRC) connection with a base station so that the network knows to which base station (or cell thereof) the UE belongs and can transmit data to and receive data from the UE. The UE also establishes a default Evolved Packet System (EPS) Bearer to an endpoint beyond the base station, typically a gateway, in the Enhanced Packet Core (EPC) network, or core network for short. An EPS Bearer (which also includes a Radio Bearer (RB) element between each UE and their respective serving base station) defines a transmission path through the network and assigns an IP address to the UE, at which it can be reached by other communication devices, such as another UE, An EPS Bearer also has a set of data transmission characteristics, such as quality of service, data rate and flow control parameters, which are defined by the subscription associated with the UE and are established by the Mobility Management Entity (MME) upon registration of the UE with the network.

The EPS Bearer is thus managed by the MME, which signals to the UE when it needs to activate, modify, or deactivate a particular EPS Bearer. The Radio Bearer is managed by the base station (which might further be controlled by the MME). Thus there are always two connections between the UE and the communication network: one for the user data transmitted using the established EPS bearer (also known as the user plane) and another one for managing the EPS Bearer and its elements (also known as the control plane). Further details of the EPS Bearer architecture can be found in 3GPP TS 23.401 V11.2.0 and 3GPP TS 36.300 V11.2.0, the contents of which are hereby incorporated by reference.

As part of the Long Term Evolution (LTE) Of UTRAN (UMTS Terrestrial Radio Access Network) referred to as E-UTRAN, there are plans to introduce a feature of direct device-to-device (D2D) communication when the UE can communicate user data to another UE that is within the transmission range of the first UE without the need to use LTE network resources. This direct communication would result in better utilization of the available resources, especially on the radio interface, where these are limited.

D2D services might be particularly beneficial for users of professional mobile radio (PMR) networks, such as Terrestrial Trunked Radio (TETRA), and the like. Since PMR networks are mainly used by government agencies, emergency services, (police forces, fire departments, ambulance), rail transportation staff, transport services and the military, D2D voice and/or data services may be used:
- to ensure increased resilience in case of network failure by using direct mode as a fall-back solution;
- to support reliable communication between mobile telephones in areas where network coverage is normally not required/provided; and
- to create person-to-person or person-to-group communications in areas without network coverage at all, such as large buildings, tunnels, basements, etc.

Although in LTE the D2D communication is predominantly controlled by the network operator (i.e. the setting up of direct radio hearers between two user devices is executed based on control parameters received from their respective serving base stations), in some cases (e.g. for users of PMR) it might be beneficial to allow user devices to initiate D2D communication with each other without any network provided control parameter. This may be beneficial (or even necessary) in some of the above mentioned cases, especially when a D2D communication session involves at least one user device that is operating outside the coverage area of LTE base stations and hence would not able to obtain D2D control information from the network. Therefore, if such D2D capable user devices are within communication distance from each other, they might set up a D2D communication channel between them without the LTE network provided control parameters.

However, when user devices are operating a D2D channel that has been set up without control parameters provided by the network, a particular problem might arise that their transmissions over this D2D channel might cause harmful interference to nearby LTE devices (and vice versa). Such interference is even more likely to happen when the D2D channel (at least partially) overlaps with the LTE channels (i.e. the licensed LTE, spectrum) used by the network or when these user devices (re)enter the coverage area of an LTE base station whilst still transmitting on the D2D channel.

SUMMARY OF THE INVENTION

It is thus an object of the present invention to reduce or eliminate the interference resulting from D2D transmission whilst still making it possible for D2D capable user devices to communicate with each other even in the absence of an LTE network.

Accordingly, in one aspect the invention provides a mobile communication device for communicating using device-to-device (D2D) communication, the mobile communication device comprising: means for establishing D2D communication, with another mobile communication device; means for searching for a communication network whilst communicating with the other mobile communication device using said D2D communication; means for providing, to a communication network and responsive to said communication network being found during said searching, an indication that the mobile communication device is engaged in said D2D communication; means for receiving a response to the indication from said communication network; and wherein the mobile communication device is operable to continue, or not continue, the D2D communication based on the response.

The means for establishing D2D communication might be operable to coordinate the presence of gaps in said communication, and the searching means might be operable to monitor for the communication network during the gaps in said communication.

The receiving means might be operable to receive a response comprising information for authorising the D2D communication and the mobile communication device might be operable to continue D2D communication based on the response.

The mobile communication device might be operable to cease said D2D communication in the absence of the response within a defined time period.

The response might comprise reconfiguration information and the mobile communication device might be operable to reconfigure said D2D communication based on the reconfiguration information. In this case, the mobile communication device might be operable to reconfigure said D2D communication to be controlled via the communication network based on the reconfiguration information.

The receiving means might be operable to receive a response comprising information indicating that said D2D communication has not been authorised and the mobile communication device might be operable to cease said D2D communication based on the response.

The mobile communication device might be operable to continue said D2D communication in the absence of the response.

The response might comprise reconfiguration information and the mobile communication device might be operable to reconfigure communication between the mobile communication devices to use a communication protocol other than a D2D based communication protocol based on the reconfiguration information. In this ease, the mobile communication device might be operable to reconfigure said communication between the mobile communication devices to use a cellular communication protocol (e.g. a long term evolution (LTE) based communication protocol).

The mobile communication device might further comprise means for establishing a connection with the communication network when the communication network has been found. In this case, the means for providing an indication might be operable to provide the indication as part of said establishing a connection. Alternatively, the means for providing an indication might be operable to provide the indication using the connection once established.

The means for establishing a connection might be operable to establish a Radio Resource Control (RRC) protocol connection. The means for establishing a connection might be operable to send at least one of an 'RRC Connection Setup Request' message and an 'RRC Connection Setup Complete' message as part of said establishing a connection and the means for providing an indication might be operable to provide the indication in the at least one said 'RRC Connection Setup Request' message and 'RRC Connection Setup Complete' message.

The response might comprise at least one RRC protocol message, for example, at least one 'RRC Connection Configuration' message.

The indication providing means might be operable to provide further information identifying at least one of: a channel and/or a frequency used by said D2D communication; an interference level; an amount of data to be transmitted using, said D2D communication; a priority level of said D2D communication; the mobile communication device; and/or the other mobile communication device. The further information might be provided in response to receiving a request from a node of the communication network.

The mobile communication device might be one of a mobile telephone, a laptop computer, and a personal digital assistant.

In another aspect the invention provides a communication node in a communication network for controlling a mobile communication device engaged in a device-to-device (D2D) communication, the communication node comprising: means for obtaining an indication that the mobile communication device is engaged in D2D communication; means for determining, based on said obtained indication, whether or not said D2D communication should be authorised and means for providing to the mobile communication device, in response to said indication, information indicating that said D2D communication has been authorised or information indicating that said D2D communication has not been authorised.

The communication node might further comprise means for configuring the mobile communication device. The configuring means might be operable to reconfigure said D2D communication to be controlled via the communication network. The configuring means might be operable to reconfigure said communication between the mobile communication devices to use a communication protocol other than a D2D based communication protocol. In this case, the configuring means might be operable to reconfigure said communication between the mobile communication devices to use a cellular communication protocol (e.g. a long term evolution (LTE) based communication protocol).

The communication node might further comprise means for establishing a connection with the mobile communication device and the obtaining means might be operable to obtain the indication during or after said establishment of the connection.

The obtaining means might be operable to obtain, from at least one other communication node connected to the communication node, information relating to said D2D communication. In this case, the obtaining means might be operable to obtain information data relating to said D2D communication before the establishment of said radio connection.

The obtaining means might be operable to obtain information relating to a level of interference resulting from said D2D communication and the determining means might determine that said D2D communication should not be authorised when said level of interference is above a predetermined threshold.

The obtaining means might be operable to establish a Radio Resource Control (RRC) protocol connection with the mobile communication device and/or another mobile communication device. The obtaining means might be operable to receive at least one RRC protocol message. The at least one RRC protocol message might comprise at least one of an 'RRC Connection Setup Request' message and an 'RRC Connection Setup Complete' message and the means for obtaining an indication might be operable to obtain the indication from the at least one said 'RRC Connection Setup Request' message and 'RRC Connection Setup Complete' message.

The providing means might be operable to send at least one RRC protocol message. In this case, the at least one RRC protocol message might comprise at least one 'RRC Connection Configuration' or 'RRC Connection Reconfiguration' message.

The communication node might further comprise means for obtaining information related to said D2D communication from at least one of: the mobile communication device engaged in said D2D communication; another mobile communication device which is not engaged in said D2D communication; and another communication node in the communication network. In this case, the means for obtaining information related to said D2D communication might be operable to send a request and receive a response to the request.

The communication node might be one of a base station, a mobility management entity, and a home subscriber server.

In a third aspect the invention provides a mobile communication device for assisting a communication node managing radio channels used by a device-to-device (D2D) communication, the mobile communication device comprising: means for monitoring radio transmissions indicative of a possible D2D communication between other mobile communication devices; and means for providing information relating to said possible D2D communication to the communication node and responsive to the monitoring means detecting radio transmissions indicative of said possible D2D communication. In this case, the mobile communication device might be operable to perform said monitoring in response to a request form the communication node. The mobile communication device might further comprise means for establishing D2D communication, with another mobile communication device.

The invention also provides corresponding methods and a system comprising the above mobile communications device and the above communication node.

A further aspect of the present invention provides a computer program product comprising computer implementable instructions for causing a programmable computer device to become configured as a mobile communications device or a communication node as described above. The computer software products may be provided on a carrier signal or on a recording medium, such as a CD, DVD or the like.

BRIEF DESCRIPTION OF THE DRAWINGS

Embodiments of the invention will now be described, by way of example, with reference to the accompanying drawings, in which.

DETAILED DESCRIPTION OF THE EXEMPLARY EMBODIMENTS

Overview

Figure 1:
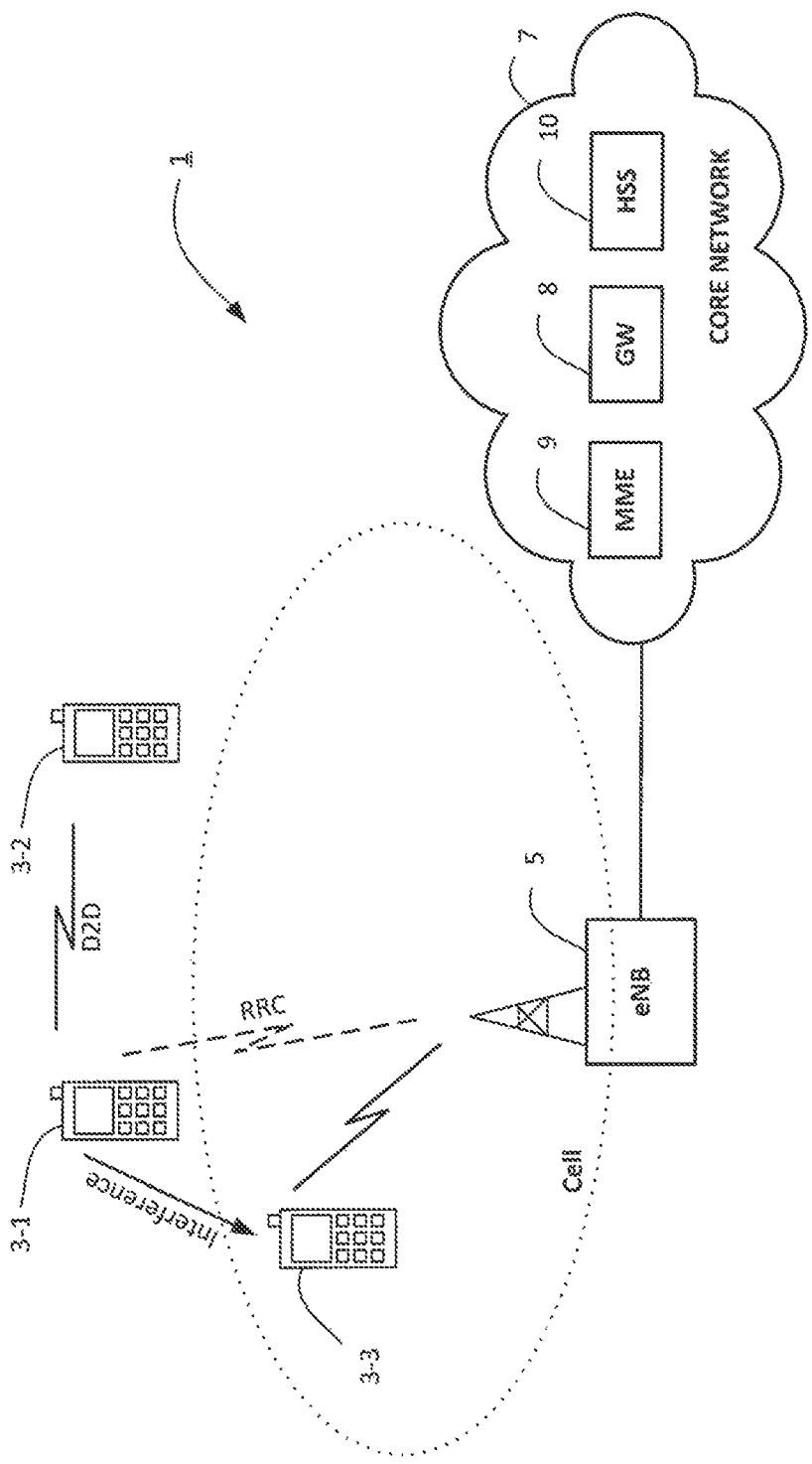
FIG. 1 illustrates schematically a cellular telecommunications system to which embodiments of the invention may be applied.

FIG. 1 schematically illustrates a cellular communication network 1 in which users of user equipment such as mobile telephones (MT) 3-1 to 3-3 can communicate with each other and other users via a base station 5 and a core network 7. As those skilled in the art will appreciate, whilst three mobile telephones 3 and one base station are illustrated in FIG. 1 for illustration purposes, additional devices and base stations may be present in a deployed system. Conventionally, when two mobile telephones 3 are in communication with each other, user plane data is routed from the first mobile telephone 3 to its base station 5, through the core network 7, one or more gateway(s) 8, back to the base station 5 serving the second mobile telephone 3, then to the second mobile telephone 3 (and similarly for user plane data sent in the opposite direction). In this example, the communication network is a Long Term Evolution (LTE) network comprising a so called Evolved UMTS Terrestrial Radio Access Network (E-UTRAN). The core network 7 in this example is an Evolved Packet Core (EPC) network which includes, amongst other things, a mobility management entity (MME) 9 and a home subscriber server (HSS) 10.

The communication paths of the cellular network described above ensure that data is transmitted between the mobile telephones 3 in compliance with the relevant subscription parameters, any service criteria required by the mobile telephones 3, and the security criteria imposed by the network. However, such an arrangement can be wasteful of resources in the base station 5, and in the core network 7, when, for example, the two mobile telephones 3 are within radio communications range of each other and a direct user plane communication link can be used instead. Moreover, in some cases, one or both of the mobile telephones 3 might be located outside the coverage area of an appropriate cellular network.

Therefore, in this example, the mobile telephones 3-1 and 3-2 are beneficially able to set up a device-to-device communication path between them without involving the cellular network thereby alleviating the pressure on network resources without the involvement of the cellular network.

The mobile telephones 3-1 and 3-2, when involved in D2D communication, are also capable of searching for a cellular network to establish an RRC connection with (for example, when the D2D communication is established when there is no network coverage). Once a cellular network (e.g. a cell of base station 5) is detected, the mobile telephone 3-1 establishes an RRC connection with the cellular network by sending an appropriate RRC request to the base station 5. Using the established RRC connection, the mobile telephone 3-1 informs the base station 5 (or another network element, such as the mobility management entity 9 via the base station 5) that the mobile telephone is involved in a D2D service with another mobile telephone 3-2.

This beneficially allows the network to take action to mitigate against potential interference to other devices operating within the cellular network (such as mobile telephone 3-3 or the base station 5) that might arise due to the D2D transmission between the mobile telephones 3.

Specifically, in this example, the base station 5 receiving the indication that the mobile telephone 3 is involved in a D2D service evaluates the received information and determines whether or not the indicated D2D service is to be maintained or another communication technology (e.g. an LTE cellular based technology) is to be used instead. The base station 5 (or another network entity, such as the MME 9) may check, for example, whether the interference caused by the indicated D2D service is below a predetermined threshold, whether the parameters used in the D2D service comply with the applicable network policies, whether communication between the mobile telephone 3 and the other communication node can or should be provided in any way other than a D2D service, etc.

If the on-going D2D service is authorised, the base station 5 sends an RRC response message to the mobile telephone 3, informing the mobile telephone 3 that it can continue its D2D transmissions. Besides the authorisation indication, the base station 5 might also include in this RRC message additional control parameters in order to instruct the mobile telephone 3 to adjust its D2D operation to avoid or eliminate interference, if necessary.

If the on-going D2D service is not authorised by the network, the base station 5 includes an indication to this effect in an associated RRC message it sends to the mobile telephone 3. Advantageously, the base station 5 might also instruct (within the same or in a subsequent message) the mobile telephones 3 to set up a cellular communication channel between them, to which communication channel the current D2D communication session may be 'handed over'. In this way the base station 5 can ensure service continuity for the mobile telephones 3 within its cells even for those communication sessions that have started as a D2D service and/or started while (at least one of) the mobile telephones 3 were located outside the coverage area of the cellular network.

In the system illustrated in FIG. 1, in order to evaluate the effect of the D2D service on the cellular network performance, the base station 5 takes into account signal measurement results from other communication nodes within its cell(s), such as mobile telephone 3-3 or the like.

For example, mobile telephone 3-3 is configured to provide periodic signal measurement reports and/or indicate unusual interference (e.g. that might arise due to an on-going D2D service that has not been authorised by the cellular network). Using the received indication relating to the on-going D2D service, the base station 5 can take preventive actions, e.g. by allocating different resources to the mobile telephone 3-3 on other, non-interfering, cellular channels, and keep the channel(s) used by the D2D service reserved for mobile telephones 3-1 and 3-2 as long as the interference exists (e.g. the interference level is determined to be higher than a predetermined threshold level).

Moreover, when the mobile telephones 3-1 and 3-2 are located outside the coverage area of the cellular network, the measurement reports provided by mobile telephone 3-3 are beneficially used as an early indication of on-going D2D transmissions near the edge of the cell(s) of the base station 5. Therefore, when the mobile telephone 3-1 (or 3-2) that is involved in a D2D service subsequently establishes an RRC connection with the base station 5, the D2D service might be authorised without the base station having to allocate resources to these mobile telephones, as the required resources have been reserved for them already.

As will become clear from the following description, once a decision is taken that a D2D connection between two mobile telephones 3 is authorised, the base station triggers the necessary signalling (e.g. RRC) that will inform the mobile telephones 3 to continue communicating using an existing D2D communication bearer. However, management of the D2D bearer transfers from the mobile telephones 3-1, 3-2 to the cellular network (e.g. as an EPS bearer for which a dedicated Traffic Flow Template (TFT) is assigned).

Therefore, in this example, control plane related to the D2D service is switched over to the cellular network at least whilst the mobile telephones 3 are within the coverage area of the network.

This approach beneficially allows D2D communications between the two mobile telephones 3 to be set up without involving a base station 5 whilst also minimising, harmful interference caused to the cellular network. By establishing an RRC connection with the base station 5, i.e. when entering the coverage area of the cellular network 1, the mobile telephone 3-1 establishes a control plane connection with the core network 7 to handle its communication with the other communication nodes. However, in this case, the mobile telephone 3-1 does not need to wait until an RRC connection is established in order to start a D2D service with another mobile telephone 3-2, and it can also fall-back to such a D2D service when it loses connection with the cellular network.

The advantages of the embodiments include that, as long as they are/remain within the coverage area of the cellular network, communication services used by the mobile telephone 3 are controlled by the network (e.g. base station 5) but when they are outside of the cellular network, and still within communication distance from each other, the mobile telephones 3 can establish a D2D service without having to rely on the base station 5. Additionally, the mobile telephones 3 (if necessary) might use communication channels that are otherwise licensed to—and hence reserved for— communication devices controlled by the communication network 1 regardless whether or not they are operating within a cell operated by one of the base stations 5.

Mobile Telephone

Figure 2:
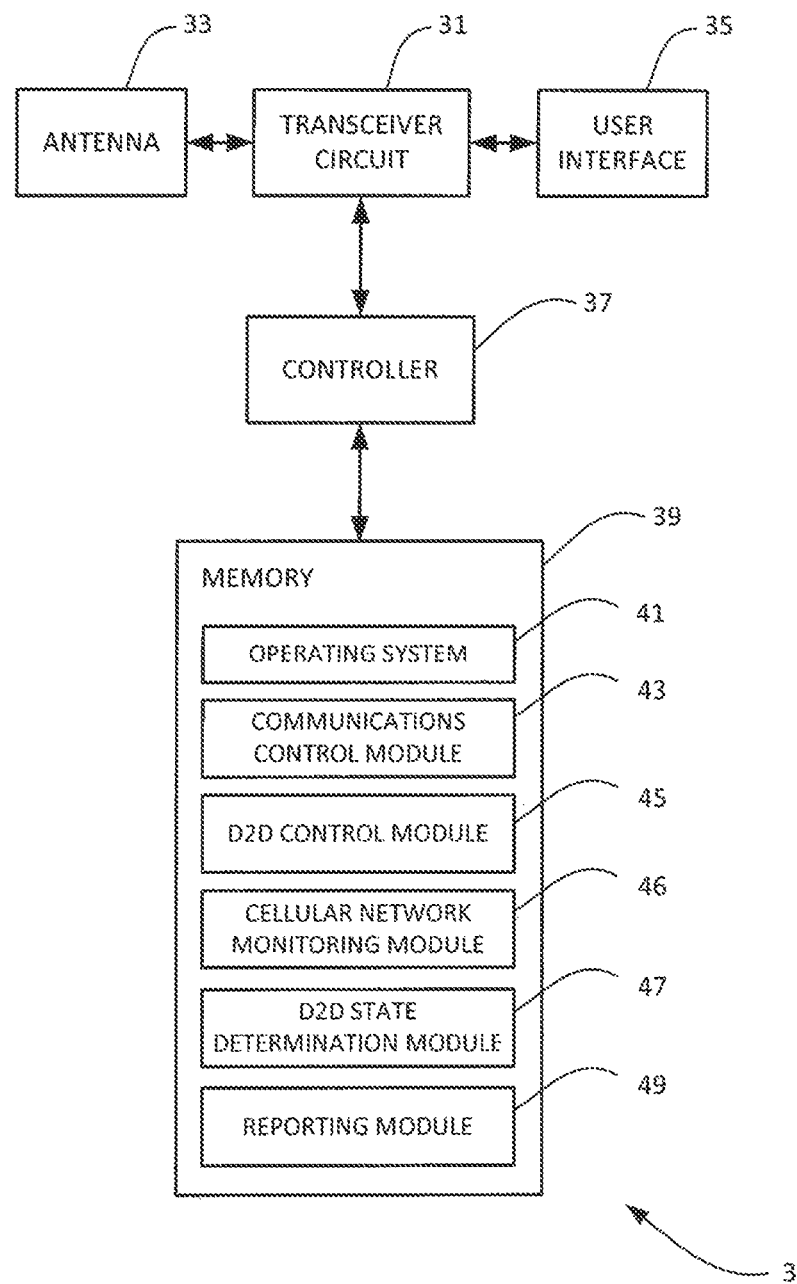
FIG. 2 is a functional block diagram illustrating some of the functionality of a mobile telephone forming part of the system shown in FIG. 1.

FIG. 2 shows a functional block diagram of a mobile telephone 3 shown in FIG. 1. As shown, the mobile telephone 3 has a transceiver circuit 31 that is operable to transmit signals to and to receive signals from a base station 5 via one or more antenna 33. The mobile telephone 3 has a controller 37 to control the operation of the mobile telephone 3. The controller 37 is associated with a memory 39 and is coupled to the transceiver circuit 31. Although not necessarily shown in FIG. 2, the mobile telephone 3 will of course have all the usual functionality of a conventional mobile telephone 3 (such as a user interface 35) and this may be provided by any one or any combination of hardware, software and firmware, as appropriate. Software may be pre-installed in the memory 39 and/or may be downloaded via the telecommunication network or from a removable data storage device (RMD), for example.

The controller 37 is configured to control overall operation of the mobile telephone 3 by, in this example, program instructions or software instructions stored within memory 39. As shown, these software instructions include, among other things, an operating system 41, a communications control module 43, a D2D control module 45, a cellular network monitoring module 46, a D2D state determination module 47, and a reporting module 49.

The communications control module 43 is operable to handle (e.g. generate, send and receive) control signals for controlling the connections between the mobile telephone 3 and other mobile telephones 3 or various network nodes, such as the base station 5. The communications control module 43 also controls the separate flows of uplink data and control data that are to be transmitted to the other mobile telephone 3 or to the base station 5.

The D2D control module 45 is operable to generate and provide instructions for the communications control module 43 for setting up a device-to-device communication path with another mobile telephone 3. The D2D control module 45 is also operable to ensure that transmission gaps are provided in the D2D service, at least whilst the mobile telephone 3 is operating outside the coverage area of an cellular network or until the D2D service has been authorised by the base station 5.

The cellular network monitoring module 46 is operable to search for available cellular networks that the mobile telephone 3 can connect to in order to obtain authorisation for its on-going D2D communication.

The D2D state determination module 47 is operable to determine whether or not the mobile telephone 3 is utilising a D2D service for its voice and/or data communication. When there is a change in the state of the D2D service, the D2D state determination module 47 informs the reporting module 49 about the current D2D state (e.g. active or inactive).

The reporting module 49 is operable to generate and send information to the base station 5 relating to the current D2D state of the mobile telephone 3. Typically, such D2D state indication is provided to the base station 5, via the transceiver circuit 31, upon the mobile telephone 3 establishing an RRC connection with the base station 5 (in this ease e.g. a 'D2D state: active' indication is provided) and when an authorised D2D service is terminated (e.g. 'D2D state: inactive' indication is provided).

Base Station

Figure 3:
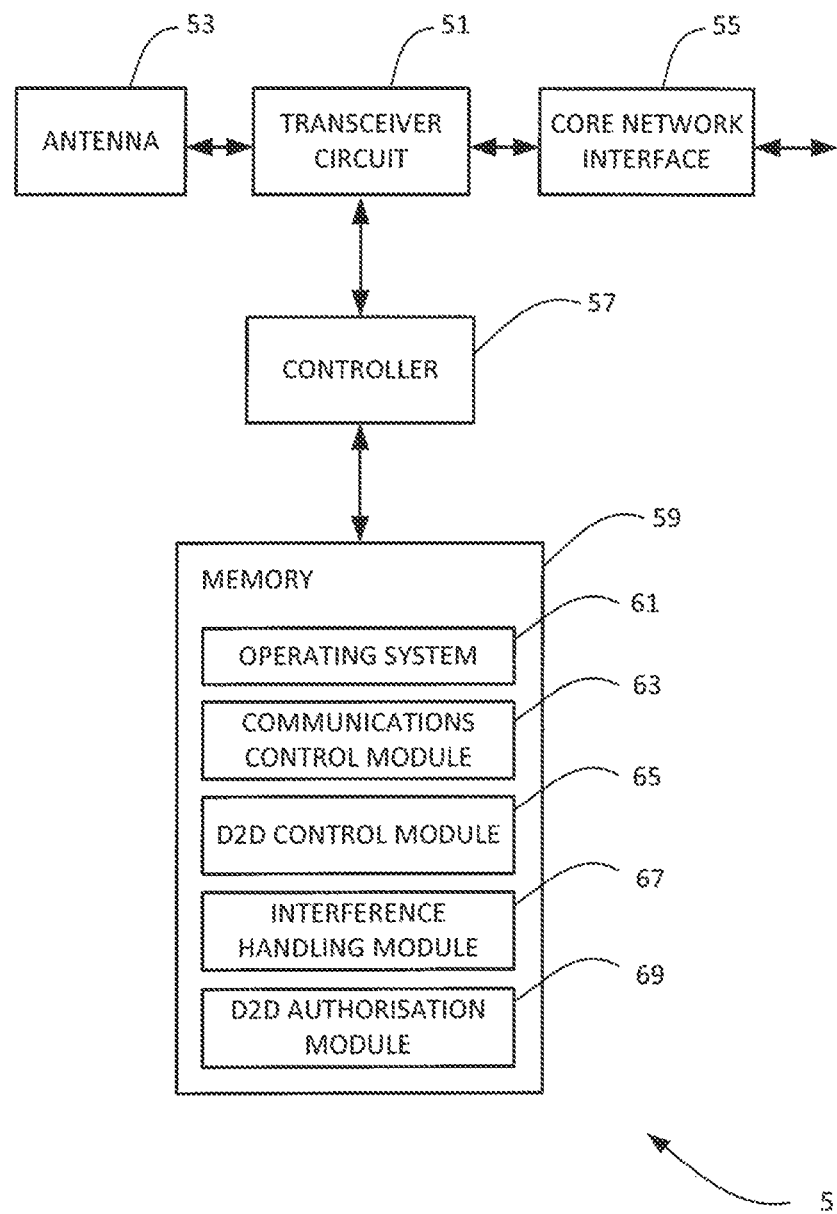
FIG. 3 is a functional block diagram illustrating some of the functionality of a base station forming part of the system shown in FIG. 1.

FIG. 3 shows a functional block diagram of the base station 5 shown in FIG. 1. As shown, the base station 5 has a transceiver circuit 51 for transmitting signals to and for receiving signals from the mobile telephones 3 via one or more antenna 53, a core network interface 55 for transmitting signals to and for receiving signals from devices in the core network 7 (such as the mobility management entity 9). The base station 5 has a controller 57 for controlling the operation of the base station 5. The controller 57 is associated with a memory 59. Although not necessarily shown in FIG. 3, the base station 5 will of course have all the usual functionality of a cellular telephone network base station and this may be provided by any one or any combination of hardware, software and firmware, as appropriate. Software may be pre-installed in the memory 59 and/or may be downloaded via the communication network 1 or from a removable data storage device (RMD), for example.

The controller 57 is configured to control the overall operation of the base station 5 by, in this example, program instructions or software instructions stored within memory 59. As shown, these software instructions include, among other things, an operating system 61, a communications control module 63, a D2D control module 65, an interference handling module 67, and a D2D authorisation module 69.

The communications control module 63 is operable to handle (e.g. generate, send and receive) control signals for the mobile telephones 3 and other network entities that are connected to the base station 5. The communications control module 63 is also operable to manage RRC connections for the mobile telephones 3 that are attached to the network via the base station 5.

The D2D control module 65 is operable to instruct the communications control module 63 to send the signalling messages required to configure or reconfigure (i.e. setup or modify) device-to-device communication links between mobile telephones 3.

The interference handling module 67 is operable to evaluate interference related indications (e.g. channel state information (CSI) and/or channel quality indication (CQI) reports) relating to the mobile telephones 3 served by the base station 5 and to take corrective actions in order to reduce the interference experienced by these mobile telephones 3.

The D2D authorisation module 69 is operable to authorise and, if necessary, reconfigure D2D communications by the mobile telephones 3 associated with this base station 5. The D2D authorisation module 69 evaluates the D2D state indications received from the mobile telephones 3 and interfaces with the interference handling module 67 to determine the effect of the indicated D2D state on the interference levels within the cell(s) of the base station 5.

In the above description, the mobile telephone 3 and the base station 5 are described for ease of understanding as having a number of discrete modules (such as the communications control modules and the D2D control modules). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities. These modules may also be implemented in software, hardware, firmware or a mix of these.

Operation—D2D Communication Continues

A more detailed description will now be given (with reference to FIG. 4) of the scenario discussed above where a D2D communications link is established between two mobile telephones 3-1 and 3-2 which is subsequently authorised by the cellular network.

Initially, as shown in step s400, the mobile telephones 3-1 and 3-2 establish a device-to-device communication path, using their respective D2D control modules 45, in order to communicate with each other. At this phase, the mobile telephones 3 (or at least one of them) are located outside the coverage area of the cellular network. In step s401, the mobile telephones 3 start using the D2D service for voice and/or data communication between them.

After initiation of the D2D service, as shown in step s402, the D2D control modules 45 coordinate the mobile telephones' D2D transmission such that there are transmission gaps (e.g. 'silent' periods) in the D2D communication when the mobile telephones 3-1, 3-2 do not transmit data to provide opportunities for the mobile telephones 3-1, 3-2 to monitor for the presence of the cellular communication network and perform measurements. This step also comprises exchanging measurement gap pattern(s) between the mobile telephones to ensure appropriate synchronisation.

In step s403, the mobile telephones 3 begin to search for a cellular network using their cellular network monitoring module 46. In this example, the cellular network monitoring module 46 uses a similar procedure that is used by RRC Idle mode mobile devices when selecting a suitable cell to camp on, which will be known to those skilled in the art and will not, therefore, be described in more detail. Unlike normal idle mode search procedures (which can occur, essentially, at any time), however, the cellular network monitoring modules 46 restrict their 'idle mode' (or 'pseudo idle mode') search procedures, while D2D communication is occurring, to coincide with the above mentioned transmission gaps.

When one of the mobile telephones discovers a cellular network, in step s404, its reporting module 49 generates and sends (via transceiver circuit 51) the base station 5 an indication that the mobile telephone 3-1 making the discovery is involved in a D2D communication service (in step S405).

In this example, between step s404 and step s405, the D2D control modules 45 coordinate the mobile telephones' transmission gaps, and adjust them if necessary, such that the gaps are sufficiently long (e.g. at least one radio-frame (or 10 ms) but preferably at least two radio-frames (or 20 ms) in duration). This allows the mobile telephones to read system information broadcast by the base station 5 and to exchange messages with the network in relation to the sending of the D2D service indication. However, the transmission gaps are kept sufficiently short, and with a sufficiently long period between the gaps, to ensure that they do not have significant impact on the D2D data/voice communication. For example, whilst a gap duration of 6 msec might be sufficient for the D2D device 3 to perform physical layer measurements, the same gap duration might not be sufficient to read the information required to establish a connection with the network due to the periodicity of system information (SI) broadcast and the time required to obtain the SI. Therefore, the D2D control modules 45 configure bigger transmission gaps (i.e. longer than 6 msec), for example, up to 80 mnsec in duration. In case of a D2D voice call service, this would mean that the D2D device 3 skips up to four voice packets (each one being 20 msec in duration). However, this might not be noticeable to the user of the D2D device 3. For other applications than voice (e.g. a D2D data service) the D2D control modules 45 might configure the same 80 msec gap duration. Alternatively, the D2D device might configure a different gap duration (e.g. longer than 80 msec) and, if necessary, rely on higher layer retransmission (e.g. TCP) of any skipped data packets.

In this example, the D2D service indication is included in the first RRC message sent from the mobile telephone 3-1 (e.g. an 'RRC Connection Setup Request' message) and is sent during one of the silent periods of the D2D service (in order to avoid interference between the mobile telephone's D2D and cellular communications). The reporting module 49 indicates the on-going D2D service, for example, by specifying a 'cause value' (e.g. the 'establishment cause') within the 'RRC Connection Setup Request' message. Thus, the mobile telephone 3-1 informs the base station 5 that the reason for establishing the RRC connection is to inform the base station 5 that the mobile telephone 3-1 is involved in a D2D service.

It will be appreciated that, alternatively, the reporting module 49 might include a D2D service indication in a message other than the first RRC message sent from the mobile telephone (e.g. the 'RRC Connection Setup Complete' message). In this case, the reporting module 49 might also include additional information identifying the type of D2D service used (e.g. duplex/half-duplex, FDD/TDD, etc.) and any further information (e.g. channels used, data rate, transmission power, UE IDs, priority, etc.) that can be used to assist the base station in its decision to authorise the D2D service. This will allow the base station 5 to prioritize certain services over others and avoid misuse of the service by mobile phone applications.

As shown in steps s404' and 405', if the other mobile telephone 3-2 finds a cellular network, it also generates and sends a D2D service indication to the base station 5 in addition to (or instead of) the indication by the first mobile telephone 3-1. Although not shown separately, the mobile telephone sending the first indication to the base station 5 might also inform the other mobile telephone about this indication e.g. using the D2D service between them) so that only one of them has to establish an RRC connection with the network for indicating the on-going D2D service. In this way, provision of redundant information and excessive signalling can be avoided. Alternatively, since at this point both mobile telephones 3-1 and 3-2 might still be located relatively far from the base station 5 (and hence might not be able to reliably transmit data to the base station 5), it might be beneficial if both mobile telephones 3 send an indication to the base station 5, by way of redundancy, to ensure safe receipt thereof.

In either case, at step s409, the D2D authorisation module 69 of the base station 5 evaluates the received information relating to the on-going D2D service which has been set up without involving the cellular network in order to determine whether or not continuation of the D2D service should be authorised and/or whether provision of the D2D service should be reconfigured.

Thus, in this step, the D2D authorisation module 69 determines whether or not this D2D service is allowed to continue, e.g. by estimating a level of interference caused by the D2D service to other, network authorised communications within the cell(s) controlled by this base station 5. In order to do this, the D2D authorisation module 69 may take account of other relevant information provided internally from the other modules of the base station 5 (such as the communications control module 63, the D2D control module 65, and the interference handling module 67) or externally from other network nodes (e.g. the MME 9, the HSS 10 or the like). For example, the D2D authorisation module 69 may take account of information identifying a priority level for the call (e.g. a high priority level being assigned to an emergency services related call) and/or to make sure that only those D2D services are authorised that are in compliance with applicable network policies (e.g. allowing specific subscriber groups, such as emergency services or specific tariff groups, to have preferential D2D access).

In this example, the D2D authorisation module 69 determines that the D2D communication is allowed to continue, and thus it generates and sends, in step s411 (and/or 411'), a message to the Mobile telephone 3-1 (and/or mobile telephone 3-2), which message authorises the D2D service with the other mobile telephone to continue. The base station 5 is thus able to reserve the communications resources being used for the D2D communication (if the base station has been provided with information identifying those resources) to avoid those resources being used for other communications (e.g. cellular) in the vicinity of the D2D communications thereby avoiding associated interference.

As shown in step s415, the mobile telephones 3 continue their D2D transmission, which has now been authorised by the cellular network.

If necessary, the D2D control module 65 of the base station 5 might also instruct the mobile telephones 3-1 or 3-2 to modify their D2D service to help avoid or alleviate interference, e.g. by providing updated D2D control parameters in the authorisation message sent at either one of steps s411 and s413, or in a separate message (not shown). Alternatively, or additionally, the D2D control module 65 of the base station 5 might instruct one or more other mobile telephones and/or base stations, using the cellular network, to reconfigure their communications to help avoid or alleviate interference.

When in step s417, the D2D service terminates (e.g. due to the user of either mobile telephone 3-1 or 3-2 ending the D2D service or the mobile telephones 3 running out of data to be sent), which is detected by the D2D state determination module 47, the cellular network monitoring module 46 checks whether the mobile telephone 3-1 is still within the coverage area of the cellular network. If the cellular network monitoring module 46 finds that the mobile telephone 3-1 is still camping on a cell of the base station 5, it triggers the reporting module 49 to generate and send (as shown in step s419) an indication to the base station 5 that the previously authorised D2D service has been terminated. Alternatively, or additionally, the second mobile telephone 32 might also generate and send this indication, as illustrated in step s419'.

In step s423, the base station 5 evaluates the received indication and, if necessary, allocates the resources (e.g. channels) previously used by (and possibly reserved for) the D2D service to other communication devices as appropriate. Since the base station 5 is now aware of the termination of the D2D service, it also knows that the frequencies previously affected by the D2D service would no longer suffer harmful interference from mobile telephone 3-1 or 3-2.

Advantageously, therefore, the manner in which the D2D service is authorised by the base station 5 can be used to help alleviate, or avoid, interference caused by the transmissions of mobile telephones 3-1 and 3-2 to the other communication nodes in their vicinity.

Thus, the mobile telephones 3 are able to communicate with each other even in the absence of an cellular network (e.g. in large buildings where there is no coverage such as in tunnels, basements, underground garages etc, to provide person-to-person communications). However, once they are within range of a network, it is ensured that their on-going D2D session remains in compliance with existing network policies and that harmful interference is reduced or eliminated.

Operation—D2D Communication Transfers to Cellular Communication

Figure 5:
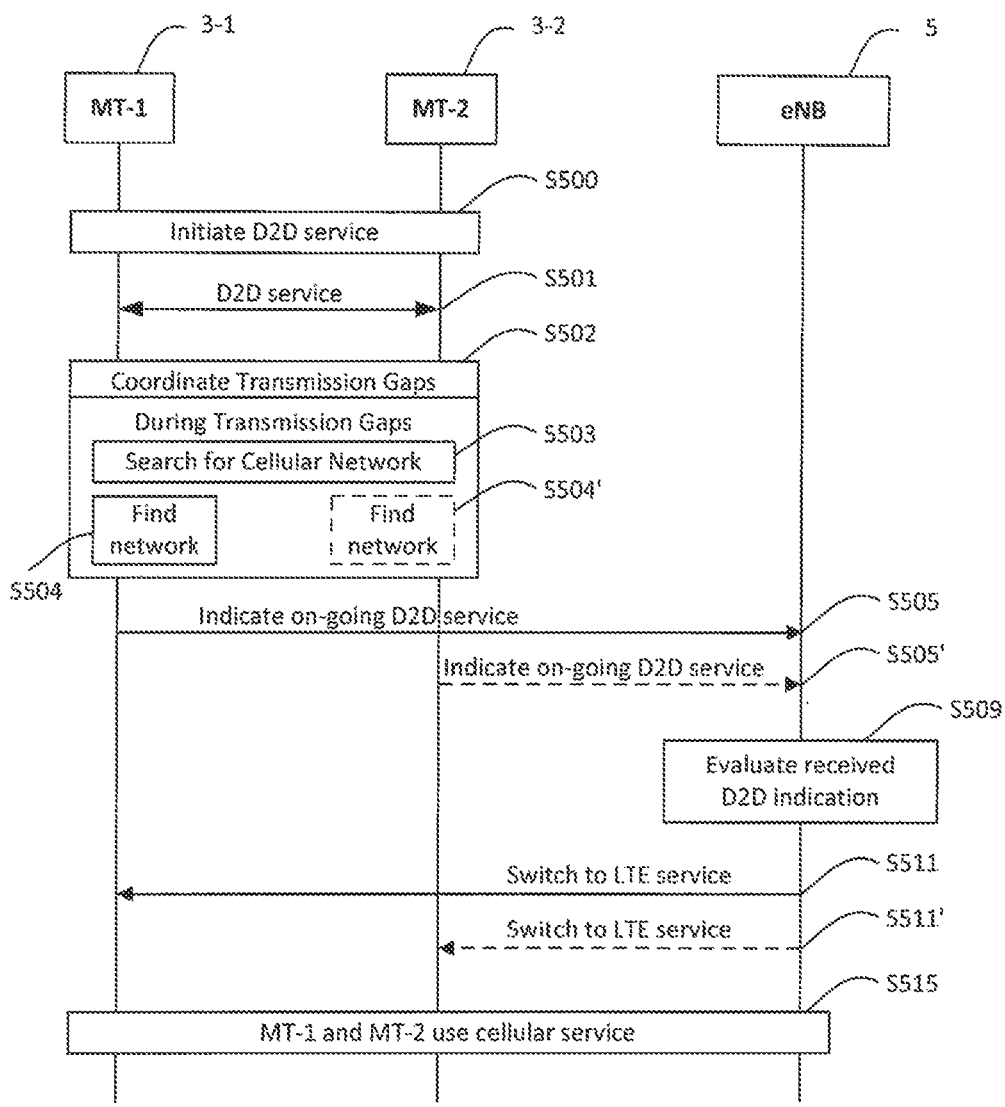
FIG. 5 is a timing diagram illustrating the way in which the base station instructs the mobile telephone, to switch from an already set up D2D service to an LTE service.

A more detailed description will now be given (with reference to FIG. 5) of the scenario discussed above where a D2D communications link is established between two mobile telephones 3-1 and 3-2, and which is subsequently replaced by a cellular service.

Figure 4:
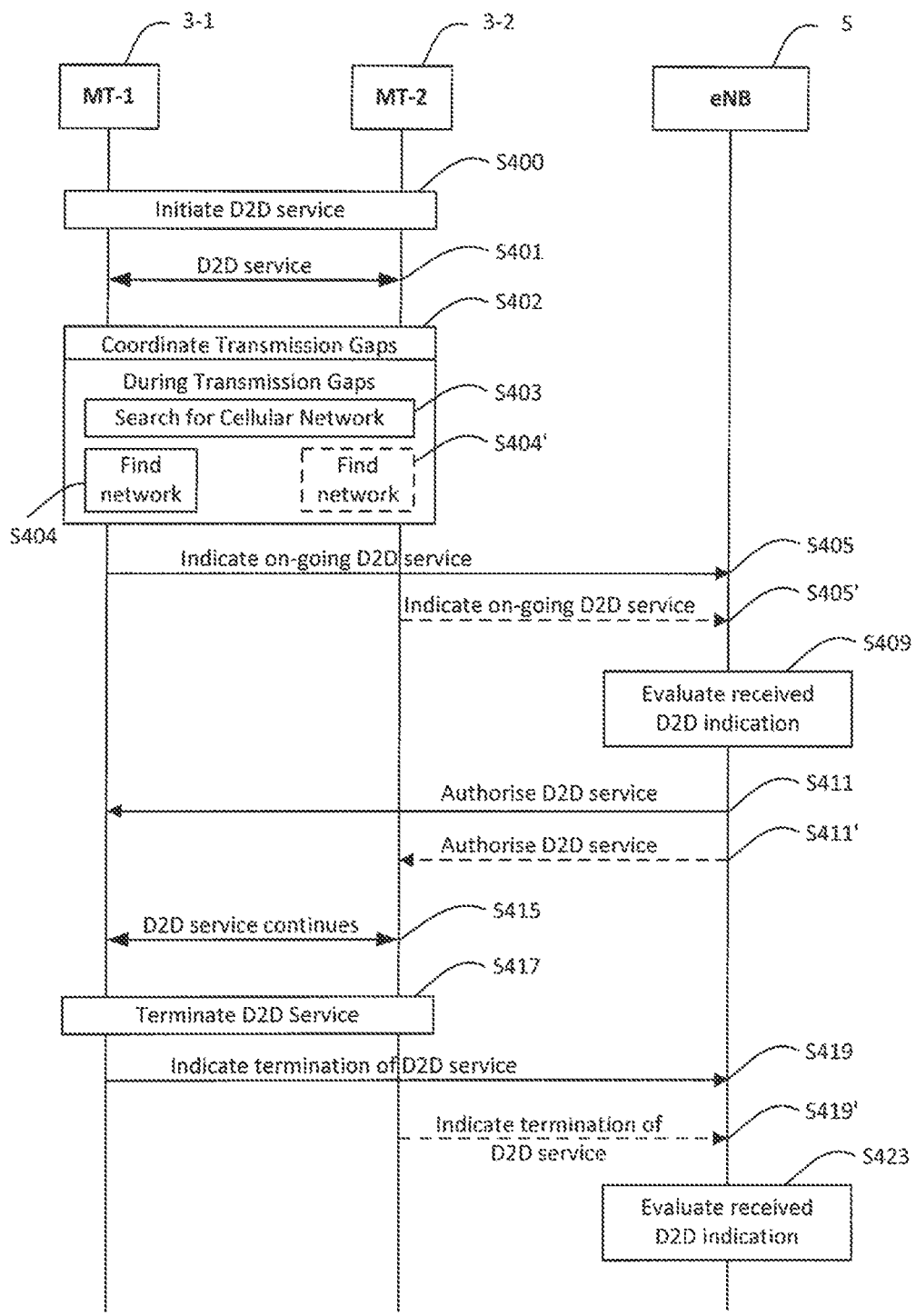
FIG. 4 is a timing diagram illustrating the way in which the base station authorises an already set up D2D connection.

Steps s500 to s507 are similar to steps s400 to s405' of FIG. 4, respectively. However, instead of authorising the already existing D2D service, at step s509 the D2D authorisation module 69 of the base station 5 determines that the mobile telephones 3-1 and 3-2 should switched over to a cellular service instead. This may be necessary, for example, when the interference caused by the D2D service is above a predetermined threshold (as indicated by the interference handling module 67), or when there is a need to provide additional functions that are not available using the D2D service (e.g. security related functions, subscription related functions, positioning functions, power optimisation, or the like).

In this step (i.e. s509), the base station 5 might also verify that both mobile telephones involved in the D2D service are reachable via the cellular network before trying to switch their communications over to a cellular based service. This verification step might comprise, for example, waiting for both mobile telephones to establish an RRC connection, send a D2D service indication, or respond to a paging message by the base station.

Authorisation of any on-going D2D service may depend on the network operator's policy if the on-going D2D service is indicated to be critical, then the network will authorise the service to continue (for example, D2D communications by fire and/or emergency personnel). However, regardless of the type or importance of the D2D service, it is important that the network is made aware of an on-going D2D service within its coverage area. For example, LTE networks (which are operated as commercial systems) need to be aware of communications by user equipment that may be misusing the D2D service, cause interference, and thereby result in a loss of revenue for the network operator.

After the base station 5 determines that a cellular service should be used instead of the indicated D2D service, at step s511 (and/or at step 511'), its D2D authorisation module 69 generates and sends to the mobile telephone a message (or series of messages) instructing it to switch over to a cellular service. The message(s) also include(s) the necessary control parameters provided by the communications control module 63 (e.g. resource allocation, quality of service, modulation and the like) for the mobile telephones 3 to be able to use a cellular communication path via the base station 5.

In step s515, the mobile telephones 3 set up an LTE communication path (using their respective communications control modules 43) and start communicating with each other via the cellular network. Next, in step s517, the D2D control module 45 terminates the D2D service between the two mobile telephones 3.

One benefit associated with this alternative is that the mobile telephones 3 are able to communicate with each other even in the absence of a cellular network. However, once they enter the coverage area of a network, they switch over to cellular services and might thus benefit from a more reliable service and/or a broader range of services than would be available using the D2D service.

Operation Indirect Detection of D2D Communication

A more detailed description will now be given (with reference to FIG. 6) of the scenario discussed above where a mobile telephone 3-3 detects and indicates an on-going D2D communication, that it is not involved in, to the base station 5.

In this case, at step s601, the base station 5 requests the mobile telephone 33 to perform measurements for use in identifying the possible presence of D2D transmissions that might cause interference to communications in the cellular network. Although preferably this mobile telephone 3-3 is also capable of D2D transmissions, in this example it is not involved in any D2D service. The request sent at step s601 may, for example, be an 'RRC UE information Request' message which is defined in 3GPP TS 36.331 v 11.2.0, the contents of which are incorporated herein by reference.

Next, in step s603, the mobile telephone 3-3 performs the requested measurements (effectively 'looking' for a D2D transmission). This step may be performed once, periodically, or continuously, depending on the request received at the previous step.

The reporting module 49 of the mobile telephone 3-3 generates and sends, in step s605, a measurement report that effectively acts as an indication, to the base station 5, whether or not a D2D service is likely to be occurring in the vicinity. This message is, for example, an 'RRC UE Information Response' message which is sent in response to the request at step s601. Additionally, the reporting module 49 might include interference information in this message or in a subsequent one (not shown) to indicate to the base station 5 whether or not the mobile telephone's transmissions are being adversely affected by a potential D2D service.

The information provided by the reporting module 49 might, for example, include information on uplink and downlink channel quality and Radio Resource Management (RRM) measurements.

Figure 6:
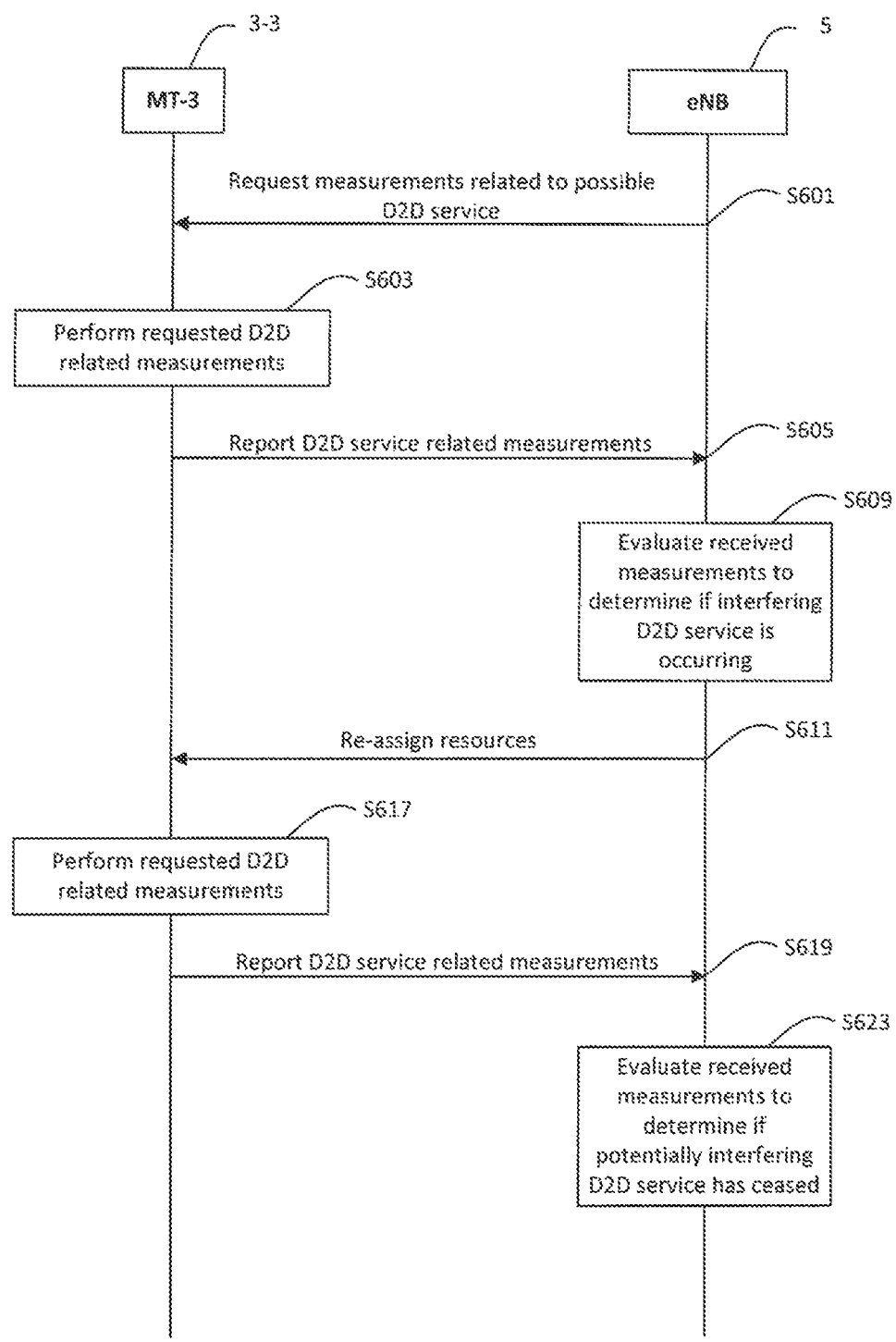
FIG. 6 is a timing diagram illustrating the way in which the base station obtains information relating to a D2D service from a mobile telephone.

The approach described with reference to FIG. 6 is particularly beneficial when both uplink and downlink use the same frequency spectrum (e.g. in case of LTE Time-Division Duplex (TDD) transmissions) as the D2D services. However, the approach is also beneficial in the case when at least one of the uplink and downlink resources coincides with resources used by the D2D service (e.g. in case of Frequency-Division Duplex (FDD) transmissions).

Upon receipt, of the measurements related to the potential presence of a D2D service, by the base station 5, the interference handling module 67 evaluates the received information, in step s609, to determine if a D2D service appears to be occurring. The base station 5 can thus perform corrective actions in order to reduce or eliminate any harmful interference caused by a detected D2D service. For example, the interference handling module 67 might mark the channels used by the on-going D2D service as being reserved (in use) or make them available for those services only that do not require interference-free transmission (e.g. services that are not time-critical).

In step s611, the base station 5 assigns non-interfering communication resources to the mobile telephone 3-3 thereby alleviating or eliminating associated interference.

In this example, the mobile telephone 3-3 continues to perform the requested measurements in step s617, and provides these to the base station in step S619. If the measurements indicate that a previously detected D2D service has terminated or its potential interference has become lower than a predetermined threshold the base station 5 detects this at S623.

Upon determination of potential D2D related interference ceasing, in step s623, the base station 5 evaluates the received information and adjusts its operation accordingly. For example, the interference handling module 67 might make the channels previously used by the on-going D2D service available again for time-critical services.

Modifications and Alternatives

Detailed embodiments have been described above. As those skilled in the art will appreciate, a number of modifications and alternatives can be made to the above embodiments whilst still benefiting from the inventions embodied therein. By way of illustration only a number of these alternatives and modifications will now be described.

For example, it will be appreciated that the network search, as indicated at steps s403 and s503, might be performed by the mobile telephone only once, periodically, or even continuously. Although in the above examples the network search has been described as being performed during the silent periods (i.e. transmission gaps) of the D2D service, it will be appreciated that the network search might be carried out even during D2D transmissions (i.e. outside the transmission gaps). For example, if the mobile telephones are communicating using a half-duplex D2D channel (either TDD of FDD), they will either transmit or receive over the D2D channel and communication gaps may thus be provided when they switch between the transmit and receive mode of operation. In this case there may be no need to provide additional transmission gaps than what is already mandated by the half-duplex D2D communication channel. For those mobile telephones that are capable of simultaneously searching for a cellular network and transmitting data over the D2D communication channel, it is not necessary to provide transmission gaps at all. Therefore, at least in the above situations, steps s402 and s502 may be omitted or might be combined with steps s400 and s500, respectively.

Furthermore, it will be also appreciated that the mobile telephone will continue its network search even after the base station has authorised the on-going D2D service. This might be necessary, e.g. in case the mobile telephone needs to select a new cell to camp on (e.g. due to movement of the mobile telephone or changes in the perceived signal quality within the current cell). The network search might be performed by a mobile phone while it is operating in the RRC Idle mode. Therefore, it will therefore be appreciated that steps s403 and s503 may be performed independently of the D2D operation of the mobile telephone.

A skilled person would thus also understand that steps s405 and s505 (also s405' and s505'), in which the mobile telephone indicates an on-going D2D service to the base station, might be repeated every time a new cell or a new base station is found. In this case, the authorisation of the D2D service by the base station (i.e. steps s409 to s411/s411' and s509 to s511/s511') might also be repeated every time an indication of the on-going D2D service is received (by the same or a different base station) or even without receiving such an indication. In one alternative, an already authorised D2D service is subsequently switched over to a cellular service by the same or a different base station. This way the base station ensures that interference is kept minimised or eliminated not only at the time of receiving the D2D service indication (i.e. steps s405, s405', s505, s505') but continuously, even after authorising the D2D service. This might be particularly beneficial when changing signal or load conditions within the cell(s) of the base station necessitate using a cellular service instead of the current D2D service.

In the above embodiments a mobile telephone involved in a D2D service is configured to indicate this on-going D2D service to a base station. However, it will be appreciated that the base station might receive this indication from any other mobile telephone (i.e. one that is not involved in the D2D service) or via another network element (e.g. a neighbour base station or an entity in the core network).

In addition to the above scenarios, there is also the scenario where the two mobile telephones 3 that are communicating with each other using the D2D service find different cells to camp on which are operated by different base stations (which might be also connected to different core networks). This might happen if, for example, the two mobile telephones are subscribed to different network operators. The operation of such an embodiment is very similar to that illustrated in FIGS. 4 and 5, except that there will also be two base stations (and possibly two core networks) involved in the process. However, in this case, the first base station will authorise the D2D service for the mobile telephone it is serving and the other base station will also authorise the D2D connection to the other mobile telephone. In this case, the on-going D2D service might need to be authorised by both base stations in order to continue, if any of the mobile telephones receives instructions to switch to the cellular service, the other mobile telephone also releases the D2D service even if this has been authorised by the other base station.

In the above embodiment, two mobile telephones were allowed to establish a D2D connection with each other. As those killed in the art will appreciate, D2D connections may be established between three or more mobile telephones, such that the users of the mobile telephones may be connected together in a conference call setup.

The above embodiments have described preferred ways of indicating an ongoing D2D service to the base station and authorising mobile devices to participate in such D2D service. As those skilled in the art will appreciate, other signalling messages may be used to carry the D2D service indication towards the base stations and the authorisation towards the respective user devices. For example, in the above scenarios, the D2D service indication is transmitted between the mobile telephone and the base station using the 'RRC Connection Setup Request' message, the 'RRC Connection Setup Complete', or the 'UE Information Response' message. It will be appreciated that the D2D service indication can be transmitted in any part of the above messages, for example, in a header, payload, information element, and a protocol data unit portion of such messages. Furthermore, any other messages, such as any suitable access stratum (AS) and/or non-access stratum (NAS) message may be used.

In one particular example, the mobile telephone uses a tracking area update procedure to inform the network about its on-going D2D service. In this case, the D2D service indication might be included in a 'NAS Tracking Area Update Request' message sent to the base station. The base station obtains the D2D service indication from the NAS message before forwarding it to the Home Subscriber Server (HSS) to which it is addressed. In this case, authorisation of the D2D service might be added (e.g. by the base station) in a 'NAS Tracking Area Update Accept' message that is sent back to the mobile telephone by the HSS.

In another example, the request sent at step s601 configures cell signal measurements for the mobile telephone. In this case, step s603 comprises cell signal measurements, and step s605 comprises a cell signal reporting as specified in section 5.5 of the RRC protocol standard (3GPP TS 36.331 v11.0.0).

In yet another example, an NAS UL message or an existing UE indication RRC UL message (e.g. IDC indication, DDA indication or MBMS indication) is adapted to include the D2D service indication and/or the authorisation of the on-going D2D service.

In one particularly advantageous alternative, the base station obtains indications (e.g. cell signal measurements or the like) from a plurality of mobile telephones. Using the indications obtained from multiple sources (which might also include other network entities), the base station works out whether or not there is an on-going (unauthorised) D2D service within one of its cells. In this case, parts of the D2D service indication are provided by different mobile telephones and/or network entities.

In the above embodiments, the mobile telephone provided a D2D service indication immediately upon connecting to the base station of a detected cellular network (i.e. in steps s405/s405' and s505/s505'). However, it will be appreciated that this base station might have already addressed any interference caused by the on-going D2D service (e.g. based on an interference/D2D service indication received from another mobile telephone as illustrated in FIG. 6) before the mobile telephone establishes an RRC connection. Therefore, before sending any D2D indication to its serving base station, the mobile telephone which is involved in a D2D service might take into account whether or not there is still any interference caused to (or suffered from) the other communication nodes served by this base station. For example, the mobile telephone might perform cell signal measurements over the frequencies used by the D2D service. In case the mobile telephone does not detect any interference, or it can address the interference without involving the network (e.g. by changing its transmission characteristics), it does not need to establish an RRC connection with the base station for indicating its on-going D2D service to the network (although it might still do so for other reasons). In this case, the mobile telephone will assume that the D2D service is authorised until it receives an indication to the contrary from the base station or the other mobile telephone involved in the D2D service. This will considerably reduce the signalling needed between the mobile telephone(s) and the base station and will thus free up valuable system resources and save battery power in the mobile telephones.

However, when the interference cannot be reduced by the mobile telephone alone, it will proceed to indicate its on-going D2D service to the base station (i.e. steps s405/s405' or s505/s505').

In the above embodiments, the mobile telephones are cellular telephones operating in accordance with, for example, the lift and/or TETRA standards. Other types of user devices such as, for example, personal digital assistants, laptop computers, web browsers, etc could be used.

Although the setting up of D2D communication paths have been described between mobile telephones within the same communication network, the D2D communication paths according to the invention may be set up between mobile telephones located in different communication networks. In this case, the mobility management entities (and in some cases the base stations) for the respective mobile telephones are also located in different networks.

In the above description, the base station 5 and the mobile telephones 3 are described for ease of understanding as having a number of discrete functional components or modules. Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities.

In the above embodiments, a number of software modules were described. As those skilled in the art will appreciate, the software modules may be provided in compiled or un-compiled form and may be supplied to the mobility management entity or to the base station or to the mobile telephone as a signal over a computer network, or on a recording medium. Further, the functionality performed by part or all of this software may be performed using one or more dedicated hardware circuits. However, the use of software modules is preferred as it facilitates the updating of the mobility management entity 9, the base stations 5 and the mobile telephones 3 in order to update their functionalities.

Various other modifications will be apparent to those skilled in the art and will not be described in further detail here.

This application is based upon and claims the benefit of priority from United Kingdom patent application No. 1217019.7, filed on Sep. 24, 2012, the disclosure of which is incorporated herein in its entirely by reference.

The invention claimed is:

1. A method performed by user equipment (UE) comprising:
acquiring a system information block broadcast by an Evolved Universal Mobile Telecommunications System (UMTS) Terrestrial Radio Access Network (EUTRAN); and
initiating a procedure for initiating the assignment of resources related to direct communication by the UE, wherein the procedure comprises, following receipt of the system information block, sending UE device-to-device communication information to the EUTRAN that indicates a frequency for the direct communication.

2. The method according to claim 1 wherein said UE sends said device-to-device communication information in a radio resource control (RRC) message.

3. The method according to claim 1 wherein said UE sends said device-to-device communication information after entry to a radio resource control (RRC) connected state.

4. The method according to claim 1 further comprising co-ordinating the presence of gaps in said communication for the purposes of discovery.

5. The method according to claim 1 further comprising sending UE device-to-device communication information to the EUTRAN that indicates direct communication resources required by the UE.

6. The method according to claim 1 further comprising initiating a procedure for indicating that the UE is receiving direct communication wherein the procedure comprises, following receipt of the system information block, sending UE device-to-device communication information to the EUTRAN that indicates direct communication resources required by the UE.

7. The method according to claim 1 further comprising initiating a procedure for indicating that the UE is no longer to receive direct communication wherein the procedure comprises, following receipt of the system information block, sending UE device-to-device communication information to the EUTRAN to indicate the UE is no longer to receive the direct communication.

8. A method performed by an Evolved Universal Mobile Telecommunications System (UMTS) Terrestrial Radio Access Network (EUTRAN), the method comprising:
  broadcasting a system information block in a cell; and
  receiving, from a user equipment (UE), following broadcast of the system information block as part of a procedure to initiate assignment of resources related to the direct communication by the UE, UE device-to-device communication information that indicates a frequency for direct communication.

9. A user equipment (UE) comprising:
a processor and transceiver;
wherein the processor is configured to control the transceiver to:
  acquire a system information block broadcast by an EUTRAN; and
  initiate a procedure for initiating the assignment of resources related to direct communication by the UE, wherein the procedure comprises, following receipt of the system information block, sending UE device-to-device communication information to the EUTRAN that indicates a frequency for the direct communication.

10. An Evolved Universal Mobile Telecommunications System (UMTS) Terrestrial Radio Access Network (EUTRAN) comprising:
a processor and transceiver;
wherein the processor is configured to control the transceiver to:
  broadcasting a system information block in a cell; and
  receiving, from a user equipment (UE), following broadcast of the system information block as part of a procedure to initiate assignment of resources related to the direct communication by the UE, UE device-to-device communication information that indicates a frequency for direct communication.

* * * * *